United States Patent Office 2,922,813
Patented Jan. 26, 1960

2,922,813
HETEROCYCLIC PHOSPHORUS - CONTAINING MONOFLUORIDES AND PROCESS FOR MAKING SAME

William M. Lanham, Charleston, W. Va., assignor to Union Carbide Corporation, a corporation of New York No Drawing. Application April 10, 1957
Serial No. 651,834

9 Claims. (Cl. 260—461)

This invention relates to the production of certain novel 6-membered heterocyclic compounds containing phosphorus in the ring and having fluorine directly connected with phosphorus.

More especially it concerns the production of novel fluorine-containing compounds having structures corresponding to the formula

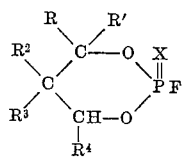

wherein X is oxygen or sulfur, and each of R, R', $R^2$, $R^3$ and $R^4$ designates a radical of the class consisting of hydrogen and the alkyl radicals. Preferably each R, R' and $R^2$ represents hydrogen or a lower alkyl radical having 1 to 6 carbon atoms, and each $R^3$ and $R^4$, respectively, represents hydrogen or an alkyl radical having 1 to 20 carbon atoms.

The novel compounds of the invention are effective insecticides, having special utility for the control of such insect pests as bean aphids (*Aphis rumicis*) and red spider mites (*Tetranychus bimaculatus*). The compounds also have prospective utility as fungicides and bactericides and may be useful in war gases, alone or in conjunction with the highly effective diisopropyl fluorophosphate. (See "Chemical Reviews," vol. 48, No. 2, pages 225–254.)

According to the invention, these novel compounds can be made by various processes herein described. Thus, they can be made by reacting a 2-chloro-2- oxo derivative of a 1,3,2-dioxaphosphorinane or of a corresponding 2-chloro-2-thiono derivative thereof, having the structure

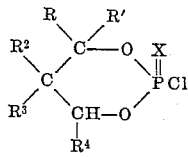

wherein R, R', $R^2$, $R^3$, $R^4$ and X have the meanings hereinbefore indicated, with an alkali metal or ammonium salt of hydrofluoric acid, at temperatures within the range from around 25° C. to around 120° C. or higher, preferably in the presence of an inert solvent for the phosphorus-containing reactant and the desired product. Among solvents suitable for use in the process are benzene, toluene, the xylenes, carbon tetrachloride, ethylene dichloride, heptane, hexane, and dimethylformamide.

The reaction temperature selected for use depends upon the choice of metal fluoride and solvent used, since certain solvent-fluoride combinations are more effective than others. Thus, although the reaction is very sluggish at 120° C. when sodium fluoride and toluene are used, the reaction occurs very readily at 70°–120° C. when potassium fluoride and dimethylformamide are employed. The same reaction is readily conducted at 25° C. when ammonium fluoride and dimethylformamide are used, and at 70° C. when benzene is used with the same fluoride.

Although it is preferred that the fluoride reactant employed in the process be essentially anhydrous, the hydrated salts can be used.

The process involves the reaction of equimolar quantities of the phosphorus-containing compound and the alkali metal fluoride or ammonium fluoride. However, an excess of the fluoride is preferred. Usually a 100% excess is employed, although a slight excess (5% to 10% mol) is sufficient.

The novel compounds also can be prepared by reacting alkali metal bifluorides or ammonium bifluoride with a pyrophosphate or pyrothiophosphate compound having a structure corresponding to the formula

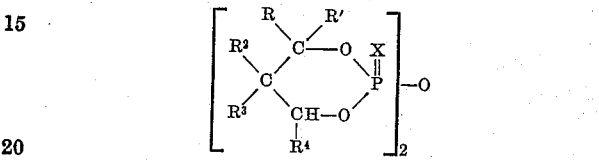

wherein X is oxygen or sulfur, and R, R', $R^2$, $R^3$ and $R^4$, respectively, designates a radical of the class consisting of hydrogen and the alkyl groups. This reaction is conducted at temperatures within the range from around 25° C. to around 120° C. or higher, and preferably in the presence of an inert solvent of the kind hereinbefore described. In this form of the invention the reaction which occurs can be illustrated by the equation:

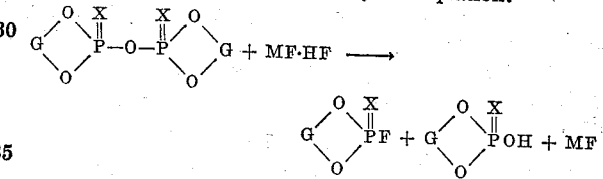

wherein G represents the hydrocarbon residue of a 1,3-alkanediol, X represents oxygen or sulfur, and M represents an alkali metal or ammonium radical.

The 2-chloro-2-oxo-1,3,2-dioxaphosphorinane starting materials can be made by reacting a 1,3-alkanediol with phosphoryl chloride in about equimolar proportions, at temperatures around —10° to 25° C., as disclosed in applicant's copending application, Serial No. 340,400, filed March 4, 1953.

The 2-chloro-2-thiono-1,3,2-dioxaphosphorinane reactants can be made by reacting a 1,3-alkanediol with thiophosphoryl chloride in the presence of a hydrogen chloride sequestering agent, as described in applicant's copending application, Serial No. 414,497, filed March 5, 1954.

The heterocyclic pyro compounds used as starting materials in one form of process can be made by reacting a 2-chloro-2-oxo-1,3,2-dioxaphosphorinane with a salt of a saturated aliphatic carboxylic acid, at temperatures around 50° C. to 200° C., as disclosed in applicant's copending application, Serial No. 388,681, filed October 27, 1953.

The novel products of the invention are readily recovered from the reaction mixture by treatment thereof with a solvent for the aforesaid products. The latter then can be purified by vacuum distillation or by crystallization from the solvent, as hereinafter disclosed in the accompanying examples illustrating the invention.

Other representative products of this invention include:
5 - butyl - 5 - ethyl-2-fluoro-2-oxo-1,3,2-dioxaphosphorinane; 5,5 - diethyl-2-fluoro-2-thiono-1,3,2-dioxaphosphorinane; 5 - ethyl - 2-fluoro-2-thiono-1,3,2-dioxaphosphorinane; 2 fluoro - 4-methyl-2-thiono-1,3,2-dioxaphosphorinane; 2 - fluoro - 4-methyl-2-oxo,1,3,2-dioxaphosphorinane; 2 - fluoro - 4,6-dimethyl-2-oxo-1,3,2-dioxaphosphorinane; 2 - fluoro - 4,6-dimethyl-2-thiono-1,3,2-dioxaphosphorinane; and the 4-ethyl-, 4-butyl-, 4-(1-ethylpentyl)-, 4-tridecyl-, 5-decyl-, 5-heptadecyl-, 4-methyl-5-ethyl-, 4,5-dibutyl-, 4-propyl-5-tetradecyl-, 5,5-dibutyl-, 5-butyl-5-dodecyl-, 4-ethyl-4,6-dimethyl-, and 4,4,5,5-tetramethyl-substituted 2-fluoro-2-oxo-1,3,2-dioxaphosphorinanes and the corresponding 2-fluoro-2-thiono-1,3,2-dioxaphosphorinanes.

Example 1

A solution of 212 grams (1 mol) of 2-chloro-5,5-diethyl-2-oxo-1,3,2-dioxaphosphorinane and 50 cc. of benzene were added dropwise to an agitated suspension of 74 grams (2 mols) of anhydrous ammonium fluoride in 500 cc. of benzene during 40 minutes while maintaining the reaction mixture at 70° C. After an additional 4 hours at 70° C. and standing overnight at 25° C., the reaction mixture was filtered, and the filtrate was stripped by distillation to a kettle temperature of 60° C. under less than 2 mm. of mercury pressure. The white crystalline residue was recrystallized from ethyl ether by dissolving in 300 cc. of the ether, cooling to −35° C., filtering, and drying at 25° C. under 2 mm. of mercury pressure. The 180 grams of white product recovered had the following properties: melting point=35°–39° C.; percent purity (by saponification)=97.8; percent P=16.22 (theory=15.79); percent F=9.47 (theory=9.68); percent C=43.31 (theory=42.87); percent H=7.43 (theory =7.19); percent yield=92.

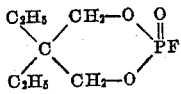

A 95–100% control of bean aphids on nasturtium plants infested therewith was secured in 24 hours by spraying the plants with an aqueous solution containing 0.125 gram of this compound per 100 cc. of said solution.

Example 2

A suspension consisting of 26 grams (0.7 mol) of ammonium fluoride in 300 cc. of dimethylformamide and 47 grams (0.206 mol) of 2-chloro-5,5-diethyl-2-thiono-1,3,2-dioxaphosphorinane was heated at 70° C. for 4 hours, filtered, and the residue was washed with ethyl ether. The filtrate and ether washings were combined and stripped by distillation to a temperature of 60° C. under 5 mm. of mercury pressure. The resultant fluid residue was dissolved in ethyl ether, washed with water, and the ether solution dried over calcium sulfate and stripped by distillation to a temperature of 40° C. under less than 5 mm. of mercury pressure. The white crystalline residue was recrystallized from ethyl ether at −30° C. and stripped by distillation at 25° C. under 5 mm. of mercury. The resultant white solid had the following properties: melting point=33°–34° C.; percent yield=54%; percent Cl=nil; percent P=14.91 (theory=14.59); percent F=8.59 (theory=8.95); percent S=14.90 (theory=15.10); percent C=39.55 (theory =39.6); percent H=6.90 (theory=6.65).

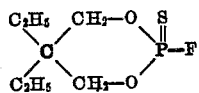

Example 3

To an agitated suspension of 1 mol of ammonium fluoride in 300 cc. of benzene maintained at 70° C. there were added dropwise during 20 minutes 0.05 mol of 2-chloro-2-oxo-4,4,6-trimethyl-1,3,2-dioxaphosphorinane. After an additional 6 hours at 70° C. the reaction mixture was filtered, the filtrate stripped by distillation at 40° C. under less than 2 mm. of pressure, and the residue was dissolved in ethyl ether, crystallized therefrom at −30° C., and the residual solvent stripped by distillation at 25° C. at 2 mm. pressure. The residual white fluffy solid product had a melting point of 38°–41° C.; and the following analysis, by weight: percent P=17.17 (theory=17.01); percent F=10.46 (theory=10.43); percent C=39.23 (theory=39.59); percent H=6.77 (theory =6.64); percent purity (by saponification)=98.1; percent yield=55.

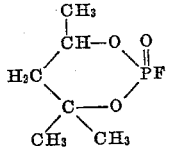

A 95–100% control of red spider mites on bean plants was secured in 48 hours by spraying the infested plants with an aqueous solution containing 0.125 gram of the compound of Example 3 per 100 cc. of said solution.

Example 4

A suspension of 2 mols of potassium fluoride in one mol of 2-chloro-5,5-diethyl-2-oxo-1,3,2-dioxaphosphorinane and 500 cc. of dimethylformamide was heated for 4 hours at a kettle temperature of 70°–120° C. Subsequently, the reaction mixture was filtered, and the filtrate stripped by distillation at 60° C. under 2 mm. of mercury pressure. The residue was dissolved in 300 cc. of ethyl ether and washed with ice water at +10° C. The ether solution then was stripped by distillation at 60° C. under 2 mm. pressure, and the white solid residue was purified by recrystallization by dissolving in ethyl ether, cooling to 0° C. and filtering. The residual ethyl ether was stripped from the residue by distillation at 30° C. under 2 mm. pressure yielding 5,5-diethyl-2-fluoro-2-oxo-1,3,2-dioxaphosphorinane as a white fluffy solid having a melting point of 35°–37.5° C.; a percent purity (by saponification) of 99.8% and the following analysis (by weight): percent P=15.48 (theory=15.79); percent F=9.37 (theory=9.68); percent C=43.30 (theory=42.87); percent H=7.43 (theory=7.19); percent yield=42.

Example 5

A suspension consisting of 2 mols of potassium fluoride in one mol of 2-chloro-5-ethyl-2-oxo-4-propyl-1,3,2-dioxaphosphorinane and 500 cc. of dimethylformamide was heated at 70°–120° C. for 4 hours. After standing overnight at 25° C., the reaction mixture was filtered, the filtrate stripped by distillation at 60° C. under a pressure of less than 2 mm. of mercury, and the residual product was dissolved in ethyl ether, washed with water at 10° C., and the washed ether solution was stripped by distillation at 60° C. under less than 2 mm. of mercury. The residual light yellow liquid residue was distilled on a falling film type of molecular still at 65° C. under less than 0.2 mm. of mercury, yielding 5-ethyl-2-fluoro-2-oxo-4-propyl-1,3,2-dioxaphosphorinane in the form of a clear, colorless distillate having the following properties: percent purity (by saponification)=96.5; $n_D^{30}$=1.4310; percent P=14.25 (theory=14.73); percent F=8.76 (theory=9.03); percent C=45.87 (theory=45.71); percent H=7.88 (theory =7.67).

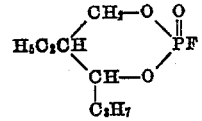

A 95–100% control of bean aphids on nasturtium infested therewith was secured in 24 hours by spraying the plants with an aqueous solution containing 0.250 gram of the compound of Example 5 per 100 cc. of said solution.

Example 6

Following approximately the procedure described in Example 1 with the exception that 250 cc. of dimethylformamide was used as solvent instead of benzene, and the reaction was conducted at 25° C. for 17 hours, a yield of 51% of 5,5-diethyl-2-fluoro-2-oxo-1,3,2-dioxaphosphorinane was secured. The product was somewhat purer than that secured in Example 1 and had the following properties: Melting point=36°–39° C.; percent purity (by saponification)=99.9%; percent P=16.46 (theory =15.79); percent F=9.84 (theory=9.68); percent C =43.06 (theory=42.87); percent H=7.45 (theory =7.19); percent yield=51.

*Example 7*

To an agitated suspension of 68 grams (1.2 mols) of ammonium bifluoride in 200 cc. of benzene held at 70° C. there were added dropwise during 30 minutes 84 grams (0.227 mol) of 2,2'-dioxo-5,5,5',5'-tetraethyl-pyro-1,3,2-dioxaphosphorinane dissolved in 400 cc. of benzene. After heating an additional 12 hours at 70° C. the reaction mixture was washed three times with water, then with dilute aqueous sodium bicarbonate, and then again with water until neutral toward litmus. The benzene solution then was dried over calcium sulfate, filtered, and the filtrate stripped by distillation at 55° C. under a pressure of less than 2 mm. of mercury. The residual white solid product was purified by recrystallization from ethyl ether by dissolving it in 100 cc. of ethyl ether, cooling to −20° C., filtering, and stripping the residue thus obtained at 25° C. under 2 mm. of mercury pressure. The 18 grams of 5,5-diethyl-2-fluoro-2-oxo-1,3,2-dioxaphosphorinane was secured as a white solid residue having the following properties: percent purity (by saponification)=99%; melting point=36°–39° C.; percent yield=40; analysis, by weight, percent P=16.05; percent F=9.94; percent C=42.86; percent H=7.24.

The by-product acid of the principal reaction is converted to the water-soluble sodium salt of the acid by the sodium bicarbonate treatment, and this salt is removed by the subsequent washing with water.

This application is a continuation-in-part of my pending application, Serial No. 417,505, filed March 19, 1954.

The invention is susceptible of modification within the scope of the appended claims.

What is claimed is:

1. As new compounds, heterocyclic fluorine- and phosphorus-containing compounds having structures corresponding to the formula

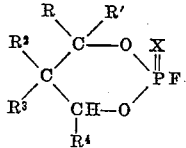

wherein X is selected from the class consisting of oxygen and sulfur; each R, R' and R² respectively, is a member of the class consisting of hydrogen and the lower alkyl radicals having 1 to 6 carbon atoms; and each R³ and R⁴, respectively, represents a member of the class consisting of hydrogen and the alkyl radicals having 1 to 20 carbon atoms.

2. As new compounds, 2-fluoro-2-oxo-1,3,2-dioxaphosphorinanes substituted on at least one of the ring carbon atoms with at least one lower alkyl group, said compounds being otherwise unsubstituted.

3. As new compounds, 2-fluoro-2-oxo-1,3,2-dioxaphosphorinanes substituted on the ring carbon atom in the 5-position by two lower alkyl groups, said compounds being otherwise unsubstituted.

4. As new compounds, 2-fluoro-2-thiono-1,3,2-dioxaphosphorinanes substituted on at least one of the ring carbon atoms with at least one lower alkyl group, said compounds being otherwise unsubstituted.

5. As new compounds, 2-fluoro-2-thiono-1,3,2-dioxaphosphorinanes substituted on the ring carbon atoms in the 5-position of the dioxaphosphorinane ring by two lower alkyl groups, said compounds being otherwise unsubstituted.

6. As a new compound, 2-fluoro-2-oxo-1,3,2-dioxaphosphorinane.

7. As a new compound, 2-fluoro-2-thiono-1,3,2-dioxaphosphorinane.

8. Process for making heterocyclic fluorine- and phosphorus-containing compounds, which comprises reacting a fluoride selected from the class consisting of the alkali metal fluorides and ammonium fluoride with a compound having the structure:

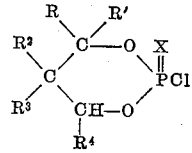

wherein X designates a member of the class consisting of oxygen and sulfur, each R, R' and R², respectively, designates a member of the class consisting of hydrogen and the alkyl radicals having 1 to 6 carbon atoms, and R³ and R⁴, respectively, designates a member of the class consisting of hydrogen and the alkyl radicals having 1 to 20 carbon atoms, in the presence of an inert solvent for the phosphorus-containing compound, and recovering from the resultant reaction mixture a compound of the formula:

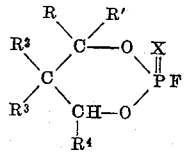

wherein X, R, R', R², R³ and R⁴ have the aforesaid designations.

9. Process for making heterocyclic fluorine- and phosphorus-containing compounds, which comprises reacting a bifluoride selected from the class consisting of the alkali metal and ammonium bifluorides with a compound having the structure:

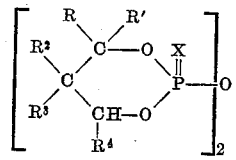

wherein X designates a member of the class consisting of oxygen and sulfur, each R, R' and R², respectively, designates a member of the class consisting of hydrogen and the alkyl radicals having 1 to 6 carbon atoms, and R³ and R⁴, respectively, designates a member of the class consisting of hydrogen and the alkyl radicals having 1 to 20 carbon atoms, in the presence of an inert solvent for the phosphorus-containing compound, and recovering from the resultant reaction mixture a compound of the formula:

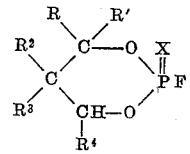

wherein X, R, R', R², R³ and R⁴ have the aforesaid designations.

References Cited in the file of this patent

UNITED STATES PATENTS

| | | |
|---|---|---|
| 2,409,039 | Hardy et al. | Oct. 8, 1946 |
| 2,661,365 | Gamrath et al. | Dec. 1, 1953 |
| 2,744,128 | Morris et al. | May 1, 1956 |

OTHER REFERENCES

McCombie et al.: Nature, 157, 287–289 (1946).
Sartori: Chem. Rev., 48, 225 and 245–254 (1951).
Mitchell et al.: J. Am. Chem. Soc., 72, 5779 (1950).

UNITED STATES PATENT OFFICE

CERTIFICATE OF CORRECTION

Patent No. 2,922,813            January 26, 1960

William M. Lanham

It is hereby certified that error appears in the printed specification of the above numbered patent requiring correction and that the said Letters Patent should read as corrected below.

Column 3, line 67, for "0.05 mol" read -- 0.5 mol --.

Signed and sealed this 5th day of July, 1960.

(SEAL)
Attest:

KARL H. AXLINE
Attesting Officer

ROBERT C. WATSON
Commissioner of Patents